(12) United States Patent
Miyanaga

(10) Patent No.: US 6,250,856 B1
(45) Date of Patent: Jun. 26, 2001

(54) QUICK ATTACHMENT STRUCTURE FOR DRILL SHANK

(75) Inventor: Masaaki Miyanaga, Miki (JP)

(73) Assignee: Kabushiki Kaisha Miyanaga, Miki (JP)

(*) Notice: Subject to any disclaimer, the term of this patent is extended or adjusted under 35 U.S.C. 154(b) by 0 days.

(21) Appl. No.: 09/380,161

(22) PCT Filed: Feb. 25, 1998

(86) PCT No.: PCT/JP98/00792

§ 371 Date: Nov. 22, 1999

§ 102(e) Date: Nov. 22, 1999

(87) PCT Pub. No.: WO98/37999

PCT Pub. Date: Sep. 3, 1998

Related U.S. Application Data

(60) Provisional application No. 60/039,563, filed on Feb. 8, 1997.

(30) Foreign Application Priority Data

Oct. 21, 1997 (JP) ................................................... 9-288092

(51) Int. Cl.[7] .............................. B23B 31/22; B23B 51/00
(52) U.S. Cl. .............................. 408/57; 279/75; 408/204; 408/226; 408/240
(58) Field of Search ............................ 279/22, 30, 75, 279/905; 408/57, 59, 204, 226, 239 R, 240

(56) References Cited

U.S. PATENT DOCUMENTS

| | | | |
|---|---|---|---|
| 1,119,276 | * 12/1914 | Griffith et al. | 279/75 |
| 1,468,732 | * 9/1923 | Bradbury | 279/75 |
| 4,090,804 | 5/1978 | Haley. | |
| 4,385,853 | * 5/1983 | Strange et al. | 408/204 |
| 4,624,608 | * 11/1986 | Shiomi et al. | 408/204 |
| 4,688,975 | 8/1987 | Palm. | |
| 5,427,482 | * 6/1995 | Asano et al. | 408/240 |

FOREIGN PATENT DOCUMENTS

| | | |
|---|---|---|
| 58-160709 | 10/1983 | (JP). |
| 60-97218 | 7/1985 | (JP). |
| 61-68813 | 5/1986 | (JP). |
| 63-186512 | 11/1988 | (JP). |
| 6-57508 | 8/1994 | (JP). |
| 7-9226 | 1/1995 | (JP). |

* cited by examiner

Primary Examiner—Daniel W. Howell
(74) Attorney, Agent, or Firm—Marshall, O'Toole, Gerstein, Murray & Borun

(57) ABSTRACT

A shank fitting structure simple in structure and easy to machine and assemble. A shank (20) has an external diameter large enough to allow it passage in a state where a detent member (5) is moved bach radially outward, and includes a stepped portion (21) for butting by providing a small diameter portion on the end side an d a recess (23) for housing the projecting part of the detent member (5) formed in the tip part. On the internal circumferential face of an opening part (2) of an arbor A, a first sleeve (6) is provided and pressed by an elastic member (8) toward the edge of the opening in such a way that its tip comes into contact with the stepped portion (21) of the shank (20) and its external circumferential face can keep the detent member (6) back toward the external circumference. A holding hole (9) for holding the detent member (5) within the range of its sliding movement is made in the wall of the arbor A, and a second sleeve (3) capable of being moved back toward the base end and pressing the detent member radially inward by the inner circumferential face when the second member is moved back toward the base end is disposed on the external circumferential face of the arbor.

14 Claims, 10 Drawing Sheets

QUICK ATTACHMENT STRUCTURE FOR DRILL SHANK

This application claims the benefit of Provisional Application No. 60/039,563 filed Feb. 8, 1997.

TECHNICAL FIELD

The present invention relates to a shank attaching structure in which a shank can be attached and detached to and from an arbor on a drilling machine side with one touch, that is, quickly and easily.

TECHNICAL BACKGROUND

Conventionally, there has been a shank attaching structure capable of attaching and detaching, with one touch, a shank of a cutter to and from an arbor having a base end portion fixed to a drilling machine (a electric hand drill or a drilling machine). In the one-touch type shank attaching structure, the shank of the cutter can be attached to the arbor with one touch by means of an engagement mechanism provided between the arbor and the shank by only inserting the shank of the cutter upward into an opening portion formed on a lower face of the arbor.

In the one-touch type shank attaching structure, however, a ring-shaped member (sleeve) provided on the outer periphery of the arbor should be relatively rotated with respect to an arbor body when the shank is to be detached from the arbor. With such a structure, for example, there is a disadvantage that the shank drops down if something comes in contact with the ring by mistake during the rotation of the drilling machine. In such a structure, furthermore, it is necessary to grip the shank by one of hands and to grip and rotate a ring-shaped member provided on the outer periphery of the arbor by the other hand, thereby relatively rotating the ring-shaped member with respect to the arbor body in an ordinary detaching work. More specifically, when the work of detaching the shank is to be performed, both hands should always be used inevitably.

With the shank attaching structure, furthermore, a concave portion for accommodating a part of a ball acting as an engagement member to be projectable into the inside diameter side should be provided on the inner peripheral face of the ring-shaped member. The depth of the concave portion becomes deeper in one rotational direction (almost U-shaped as seen in a section), that is, the internal face of the ring-shaped member (sleeve) is processed and the depth of the concave portion is gradually changed. Therefore, a special machine tool is required and a machine work is difficult to perform. As a result, a manufacturing cost is increased. In the shank attaching structure, furthermore, a plurality of coiled springs with small diameters should be provided for springs to energize the ring-shaped members in the direction of the rotation on the internal face of the ring-shaped member against the direction of the rotation. Accordingly, an inclined hole for holding the spring should be formed on the inner peripheral face of the ring-shaped member and the outer peripheral face of the arbor body, and assembly should be performed with the spring held in that state. As a result, a very difficult work should be inevitably carried out. In particular, it takes plenty of time and requires labors for processing to form the inclined hole with a predetermined angle on the inner peripheral face of the ring-shaped member. Furthermore, the above-mentioned one-touch type shank attaching structure is complicated. Therefore, a coolant cannot be supplied from the inside to a cutting edge portion of the tip of the shank. Accordingly, the coolant should be supplied from the outer periphery of the tool. For this reason, the coolant should be scattered to perform a drilling work. As a result, there has been a drawback that the coolant contaminates the circumference of a portion to be drilled and is scattered over an operator.

The present invention has been made in consideration of the circumstances, and it is an object of the present invention to provide a shank attaching structure which eliminates the above-mentioned drawbacks.

DISCLOSURE OF THE INVENTION

In order to solve the above-mentioned problems of the art, a first aspect of the present invention is directed to a shank attaching structure in which an engagement member is provided on an inner peripheral face of an opening portion formed on a tip of an arbor so as to freely retreat in a direction of an outside diameter, and a shank provided on a base end of a cutter is detachably attached to the opening portion of the arbor with one touch, wherein the shank is formed to have such an outside diameter as to pass in a state in which the engagement member provided on the arbor retreats in the direction of the outside diameter, a diameter of a base end portion of the shank is further reduced to form a stepped portion for abutment, and a concave portion(s) for accommodating a projected portion of the engagement member projected in a direction of an inside diameter is /are formed on a tip side portion of the stepped portion, a first sleeve is provided on the inner peripheral face of the opening portion of the arbor in such a manner that a tip of the first sleeve can abut against the stepped portion of the shank to retreat toward a base end side and the state in which the engagement member is caused to retreat in the direction of the outside diameter can be kept by an outer peripheral face of the first sleeve, a holding hole for holding the engagement member in a slide operation region of the first sleeve is formed in a wall portion of the arbor, the state in which the engagement member retreats in the direction of the outside diameter is kept until a tip of the first sleeve pressed toward an open end by an elastic member to be abut by the stepped portion of the shank, a second sleeve is provided on the outer peripheral face of the arbor for being moved in at least one of directions of an axial tip and a base end, pressing the engagement member in the direction of the inside diameter by the inner peripheral face of the second sleeve with the movement in one of the directions, and accommodating the engagement member in the direction of the outside diameter without the movement in one of the directions, and the second sleeve is pressed in one of the directions by an elastic member, thereby keeping a state in which the engagement member is accommodated in the concave portion of the shank, and the second sleeve is moved in a direction opposite to the one of the directions against elastic force of the elastic member, thereby causing the engagement member to retreat in the direction of the outside diameter.

According to the shank attaching structure in accordance with the present invention, when the second sleeve is simply caused to slide in one of the axial directions (the direction of the base end side or tip side) against the elastic member, the press of the engagement member in the direction of the inside diameter is released so that the engagement member retreats (moves) toward the outside diameter in the radial direction. As a result, the engagement of the shank by the engagement member is released. Consequently, the shank of the cutter can easily be detached from the arbor. Furthermore, when attaching the shank to the arbor, the shank is simply inserted into the opening portion of the arbor. Consequently, the stepped portion for abutment of the shank causes the first sleeve to retreat toward the base end side of the arbor. As a result, the engagement member projects toward the inside diameter in the radial direction. By the inserting operation, the engagement member is moved over the outer peripheral face of the shank in the axial direction in contact therewith. As a result, a projected portion of the engagement member toward the inside diameter side is accommodated in the concave portion formed in the shank. Thus, the shank is held in the arbor.

Accordingly, an operator can simply insert the shank into the opening portion of the arbor when attaching the shank, and can easily detach the shank by causing the second sleeve to slide toward the tip or the base end side against the elastic member. In other words, the shank can easily be attached and detached to and from the arbor by one hand. Furthermore, the second sleeve slides in one of the directions (the direction of the tip side or base end side) so that the shank can be attached and detached. Therefore, even if something abuts against the second sleeve by mistake in the direction of rotation as in a conventional manner, the shank never drops off. In the structure in which the engagement of the engagement member is released by pressing the second sleeve toward the base end side and causing the second sleeve to slide toward the tip side, particularly, even if the second sleeve abuts against a foreign substance or a projection on the side of an object to be drilled, the engagement state of the shank is not affected. Therefore, such a structure is excellent in workability.

In respect of works, the shank attaching structure according to the present invention can be obtained by circular works or a combination thereof. Therefore, the structure is easy to work and can easily be assembled.

In the shank attaching structure, if the engagement member is a ball(globe), the elastic member for pressing the first sleeve is formed of a coiled spring having such a dimension as to cause the outer periphery of the coiled spring to be provided along the inner peripheral face of the opening portion of the arbor, and the elastic member for pressing the second sleeve is a coiled spring having such a dimension as to cause the inner periphery of the coiled spring to be provided along the outer peripheral face of the arbor and to cause the outer periphery of the coiled spring to be provided along the inner peripheral face of the second sleeve, and the shank attaching structure can particularly be formed simply and becomes easy to work and assemble.

Furthermore, in the shank attaching structure wherein the opening portion of the arbor is extended toward the base end side to form a hole portion for supplying a coolant and to form, on the hole portion, a through hole having a tip open and extending in a radial direction is formed on the hole portion, a ring member is rotatably attached to the arbor on the outer periphery of the arbor where the hole is positioned, and a sealing member for a liquid seal is provided between the ring member and the arbor, and a passage for inserting the coolant from an upper end toward a tip side is formed in an axial core portion of the shank, it is possible to provide a drill capable of supplying the coolant from the inside of the rotating shank to a cutting edge portion also in the one-touch type shank attaching structure.

Moreover, in the shank attaching structure, a coiled spring is provided in the hole portion for supplying the coolant, and a center pin is provided in a inserting hole of the shank so as to retreat toward the hole portion side in such a manner that it is pressed toward a tip (of the center pin) side by the coil spring and the tip projects from a tip of a cutter, and a flange portion is formed in a base end portion of the center pin for being engaged with the shank side when the center pin projects, and a liquid sealing mechanism is formed for performing a liquid seal in a state in which the flange portion abuts against an engagement face of an upper end of the inserting hole with which the flange portion is engaged, so that the coolant can be supplied to the cutting edge portion side only during necessary drilling. Accordingly, the structure is excellent in that the coolant can be prevented from being consumed wastefully and the coolant is not scattered unnecessarily. In addition, the liquid sealing mechanism is constituted by the center pin and the inserting hole for supporting the same. Therefore, a very simple structure can be obtained.

Furthermore, in the shank attaching structure, the flange portion and the engagement face forming the liquid sealing mechanism comprise tapered faces which are contacted each other, it is possible to obtain the liquid sealing mechanism which is simple, reliable and durable.

In the shank attaching structure, a groove for forming a coolant passage is provided below a position which is lower by a predetermined dimension based on a lower part of the flange portion of the center pin in the composition which includes the outer peripheral face of the center pin and the inner peripheral face of the inserting hole of the shank which is in contact with the outer peripheral face, the supply of the coolant can be started only when the center pin enters the position which is lower by the predetermined dimension, that is, the cutting is started and the coolant is required. Therefore, the coolant can be prevented from being consumed wastefully.

Furthermore, in the shank attaching structure in which the position that is lower by the predetermined dimension is substantially equal to a dimension with which the center pin projects from a cutting edge portion on the tip of the shank toward the tip side in a free state in which the center pin is pressed from the base end toward the tip by the coiled spring, the coolant is supplied only when the cutting is started. Therefore, it is possible to obtain the structure which avoids waste and is excellent.

BEST MODE FOR CARRYING OUT THE INVENTION

While a shank attaching structure according to an embodiment of the present invention will be specifically described below with reference to the drawings, the present invention is not restricted to the present embodiment.

First Embodiment

Figure 1:
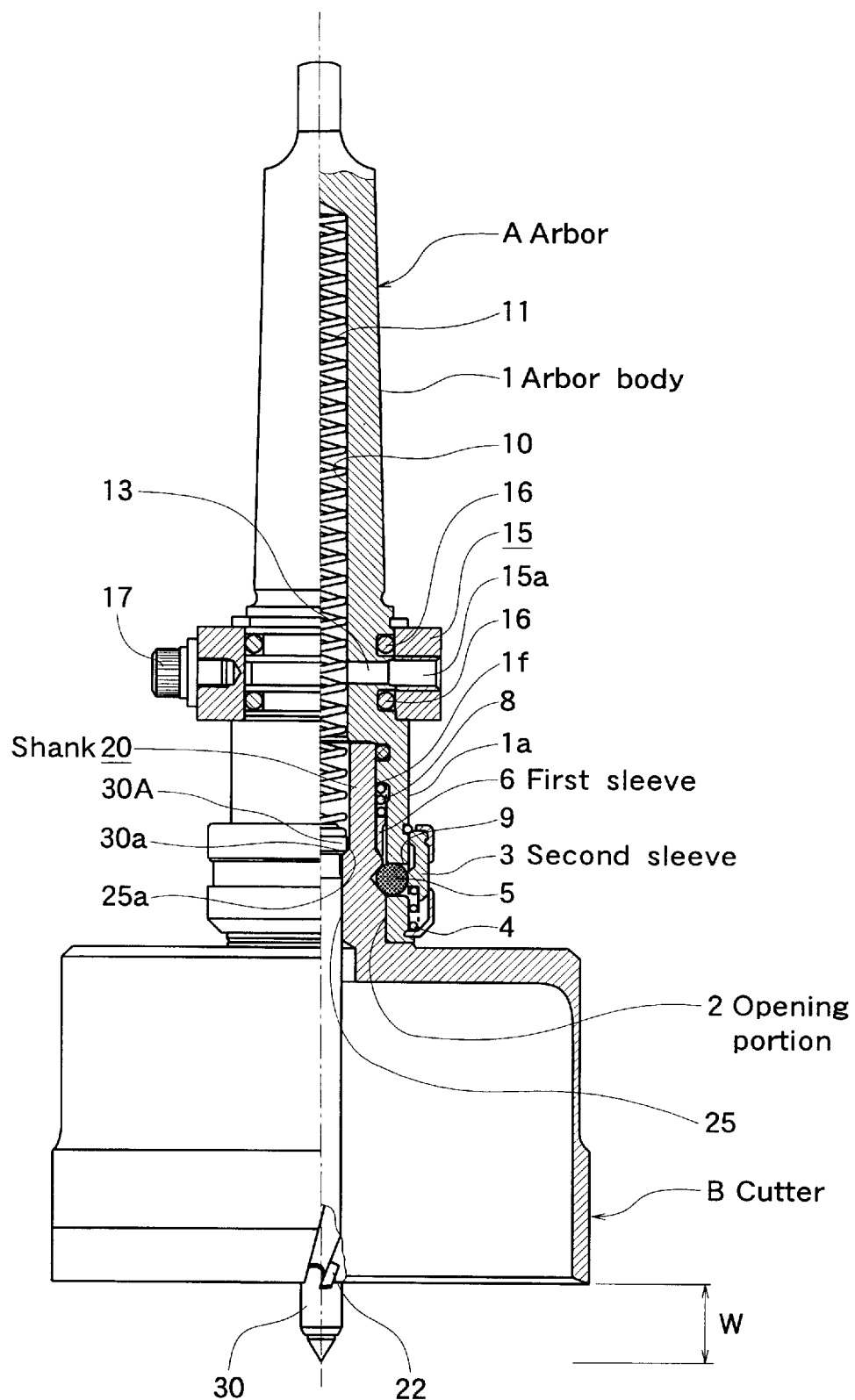
FIG. 1 is a sectional view showing a right half portion of the whole construction of a shank attaching structure according to a first embodiment of the present invention.
Figure 2:
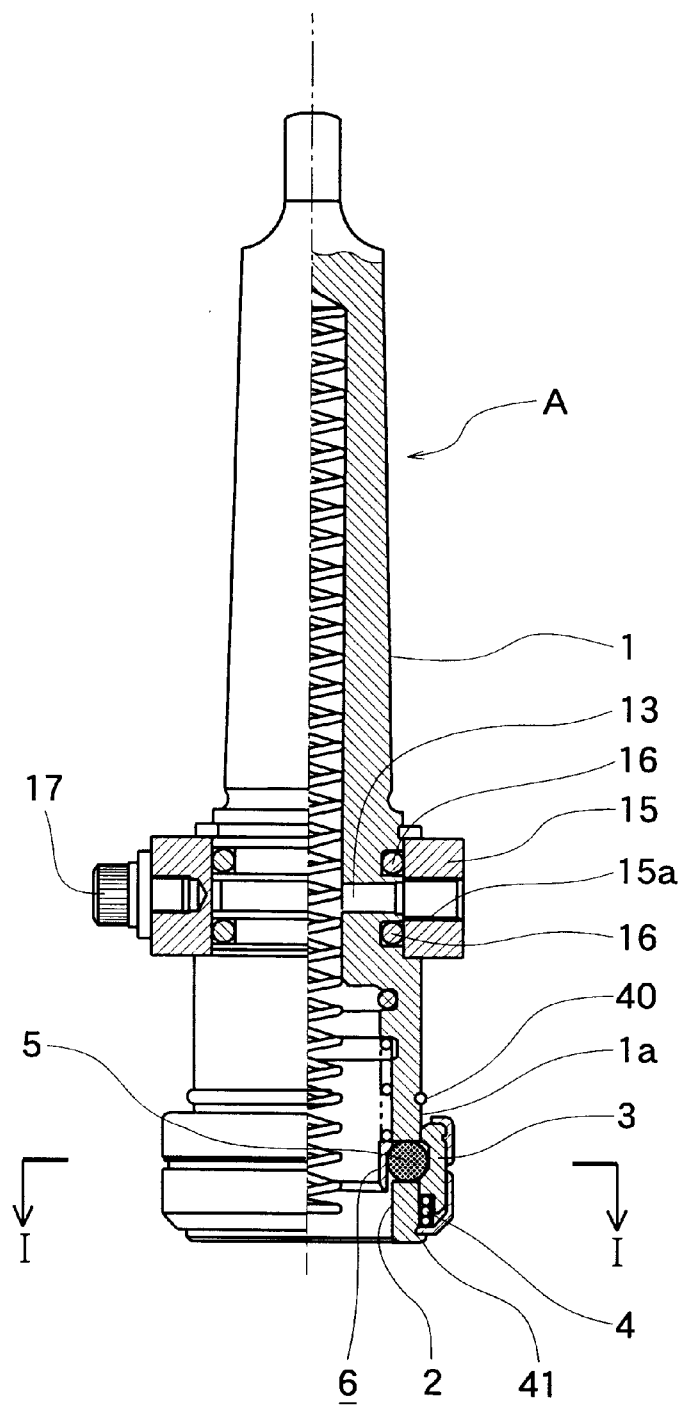
FIG. 2 is a sectional view showing a right half portion of the construction on an arbor side with a cutter detached from the shank attaching structure illustrated in FIG. 1.
Figure 3:
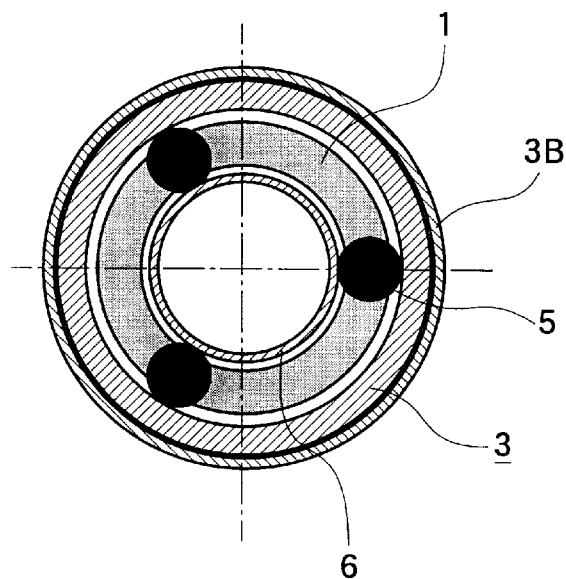
FIG. 3 is a sectional view taken along an arrow I—I in FIG. 2.

In FIGS. 1, 2 and 3 showing a first embodiment, A denotes an arbor and B denotes a cutter. The arbor A has an opening portion 2 on a tip of an arbor body 1 (a lower end in FIGS. 1 and 2) and a second sleeve 3 is slidably provided in an axial direction (a longitudinal direction : a vertical direction in FIGS. 1 and 2) along an outer peripheral face 1a of the arbor body 1 on the outer periphery of the opening portion 2 as shown in FIG. 1 or 2. In addition, the second sleeve 3 is pressed toward the base end side of the arbor A by a coiled spring 4 in the present embodiment.

It is possible to employ such a structure as to press the second sleeve 3 toward the tip side of the arbor A on a direction basis. The coiled spring 4 is provided to have an inner periphery formed along the outer peripheral face of the arbor body 1 and an outer periphery formed along the inner periphery of the second sleeve 3.

Figure 4:
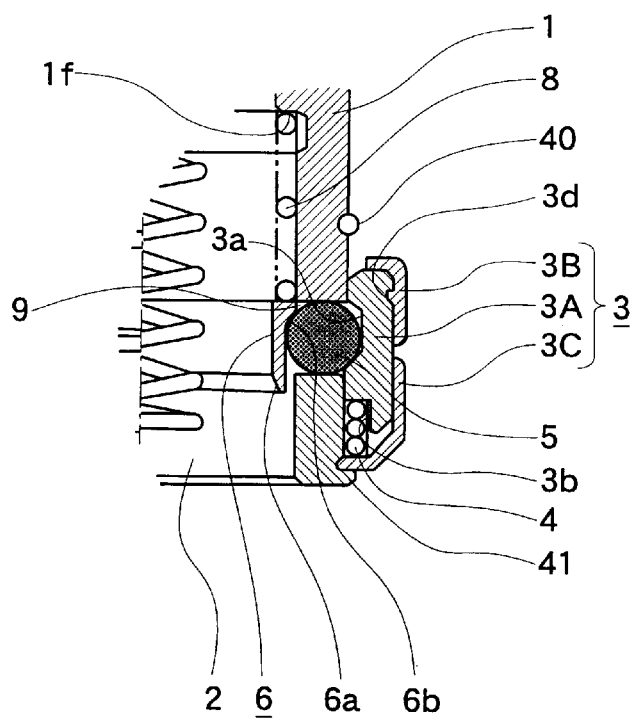
FIG. 4 is an enlarged view showing a main part of a cut right half portion of an opening portion of an arbor illustrated in FIG. 2.

The second sleeve 3 shown in FIGS. 1 and 2 is formed by three members, that is, a body 3A, a cover 3B and a cover 3C which are ring-shaped respectively as enlarged in FIG. 4. An inner face of the body 3A is provided with an annular groove 3a (an annular shape formed by a substantially round locus) having a U-shaped section for accommodating a part (an outside part) of a metallic ball(globe) 5 acting as an engagement member and a groove 3b for engaging the coiled spring opened on a lower end. The cover 3B is made of a synthetic resin. The cover 3B covers an upper end of the body 3A and is integrally fixed by means of an engagement structure 3d including concave and convex portions formed thereon. The cover 3C is made of metal, and a lower end thereof is bent toward the body 3A side to engage a lower end of the coiled spring 4 and an upper end thereof is attached (caulked) in the body 3A and is integrally fixed thereto with the lower end of the body 3A covered with the upper end. On the arbor body 1 side are provided an engagement ring 40 for regulating a slide region in the direction of the base end of the second sleeve 3 and a stopper 41 for preventing drop-off toward the tip side. The second sleeve 3 is slidably formed between the engagement ring 40 and the stopper 41.

A first sleeve 6 is provided on the inner periphery of the opening portion 2 of the arbor body 1 in such a manner that an outer periphery thereof is formed along the inner peripheral face of the opening portion 2 and can retreat toward the base body side. An inclined face 6a, for abutment against which a stepped portion 20a of a shank 20 of the cutter B abuts, is formed on a tip of the first sleeve 6 (a lower end in FIGS. 1 and 2), and an abutment face 6b for abutting against the inner peripheral face portion of the ball 5 and preventing more projection into the tip side is formed on an outer peripheral face of the first sleeve 6. A coiled spring 8 for pressing the first sleeve 6 toward the tip of the arbor body 1 is provided on the base end side of the first sleeve 6. A base end of the coiled spring 8 is engaged with a convex portion (spring mount seat) 1f formed toward an inside diameter in the vicinity of a bottom of the opening portion 2 of the arbor body 1 as shown in FIG. 1. Accordingly, the first sleeve 6 can retreat from a state shown in FIG. 2 or 4 to a state shown in FIG. 1 or 5, and a slide region is formed therebetween.

A holding hole 9 for accommodating the ball 5 therein is formed with outer and inner peripheral portions projecting into the arbor body 1 in the slide region of the first sleeve 6 and the second sleeve 3. In other words, in a state in which the shank 20 of the cutter B is not inserted, the inside and outside portions of the ball 5 which accommodated in the holding hole 9 and having a periphery held in the holding hole 9 are held by the outer peripheral face of the first sleeve 6 and the annular groove 3a having a U-shaped section formed on the inner peripheral face of the second sleeve 3 as shown in FIG. 2 or 4. On the other hand, in the state in which the shank 20 is inserted, the outside portion of the ball 5 abuts against a relatively projecting portion 3e of the second sleeve 3 (a portion on the tip side of the above-mentioned "annular groove 3a having a U-shaped section"), and the inside portion of the ball 5 abuts against a concave portion 23 formed on the outer peripheral face of the shank 20 of the cutter B, and is thus held as enlarged in FIG. 5.

Figure 5:
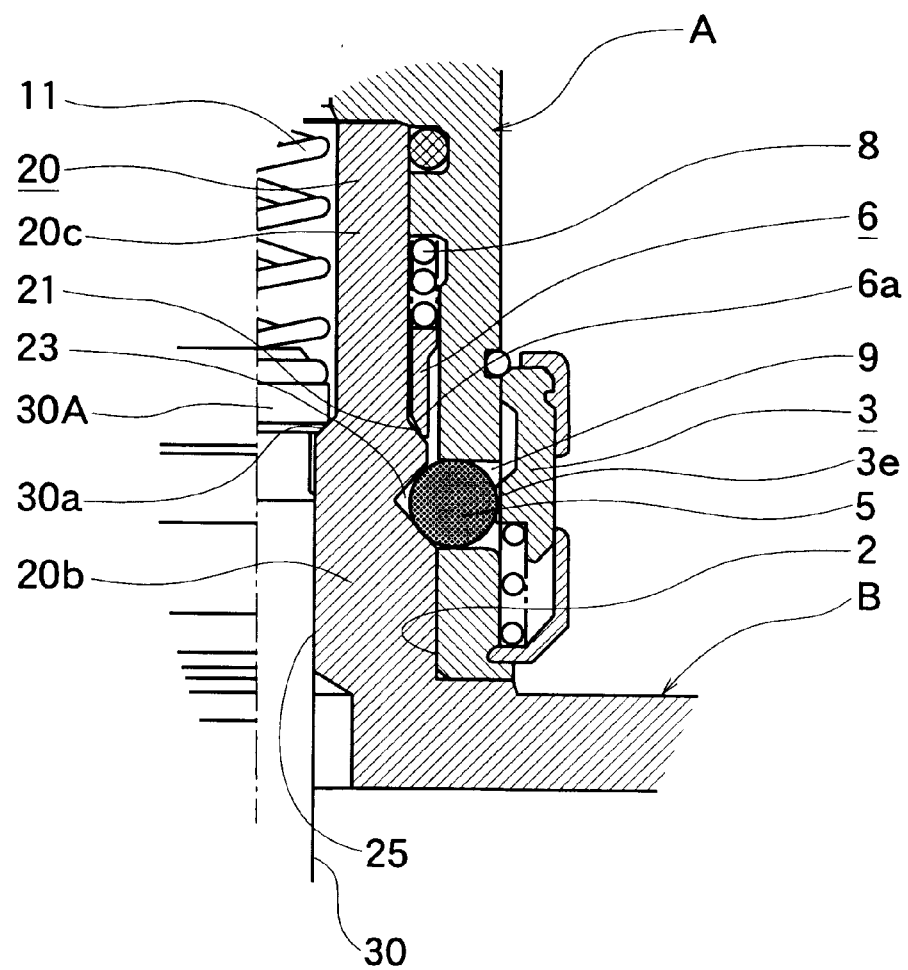
FIG. 5 is an enlarged view showing a main part of the cut right half portion of the opening portion of the arbor with a shank of the cutter inserted therein as illustrated in FIG. 1.

As shown in FIG. 1 or FIG. 5 in which a main part is enlarged, the shank 20 of the cutter B has a tip portion 20b formed with such an outside diameter to be inserted into the opening portion 2 of the arbor A, the outside diameter of the base end portion 20c is reduced more than the diameter of the tip portion 20b, and a stepped portion 21 is formed therebetween. More specifically, the outside diameter of the base end portion 20c is equal to the inside diameter of the first sleeve 6 provided on the opening portion 2 of the arbor body 1 (accurately, is slightly smaller than the inside diameter), and the stepped portion 21 is formed by an inclined face (to perform a face contact on the abutment face 6a) corresponding to the abutment face 6a on the tip of the first sleeve 6. The concave portion 23 for accommodating the ball 5 is formed adjacently to the stepped portion 21 on the tip side (lower end side as shown) of the stepped portion 21. The concave portion 23 is conical. And, in the arrangement of the shank 20, the concave portion 23 is formed in three places at an interval of 120 degrees in an axially circumferential direction corresponding to the arrangement of the ball 5 shown in FIG. 3 illustrating the axial section of the arbor A. However, the interval is not restricted to 120 degrees but may be set to an angle of, for example, 90 degrees, 60 degrees or the like. Alternatively, the angle may be non-point symmetrical with respect to an axial core. Such a structure is suitable for the case where the position of the cutter in the direction of rotation is to be specified against the arbor. An outside diameter of the shank 20 between the stepped portion 21 and the concave portion 23 is equal to the outside diameter of the tip potion where the first sleeve 6 on the arbor A side starts to come in contact with the ball 5. When the shank 20 is to be inserted into the opening portion 2 of the arbor body 1, the ball 5 can smoothly be transferred from the outer peripheral face of the first sleeve 6 to the shank 20 side. The tip side (cutting edge portion 22 side) of the concave portion 23 has a diameter slightly greater than on the base end side. Thus, the ball 5 is not moved toward the tip side of the shank any longer. In other words, the portion having the larger diameter serves to function as a stopper of the ball 5 toward the tip side.

Furthermore, a bottomed hole 10 having a smaller diameter than the diameter of the opening portion 2 of the arbor body 1 is formed on a line extending toward the base end (an upper end in FIGS. 1 and 2) side of a center line of the opening portion 2. A compressible coiled spring 11 is provided in the bottomed hole 10. On the other hand, a through hole 25 is formed on a center line (axial core) of the shank 20 of the cutter B, and a center pin 30 is provided in the through hole (a "inserting hole" according to claim 5) 25 to freely retreat toward the arbor A side. The through hole 25 is constituted such that a base end (upper end) portion has a large diameter and the tip (lower end) side has an inside diameter (accurately, which is slightly larger than) equal to the outside diameter of the center pin 30, and a connecting portion thereof is provided with a tapered sheet face (a "engagement face" according to claim 5) 25a forming a liquid sealing mechanism together with the sheet face 30a. The center pin 30 has a flange portion 30A. A lower end of the flange portion 30A is provided with a tapered sheet face 30a which can closely come in contact with the sheet face 25a. The lower end of the coiled spring 11 for pressing the center pin 30 toward the tip is engaged with an upper end of the flange portion 30A. The center pin 30 is provided to retreat toward the arbor A side with respect to the cutter B against the press force of the coiled spring 11.

Figure 6:
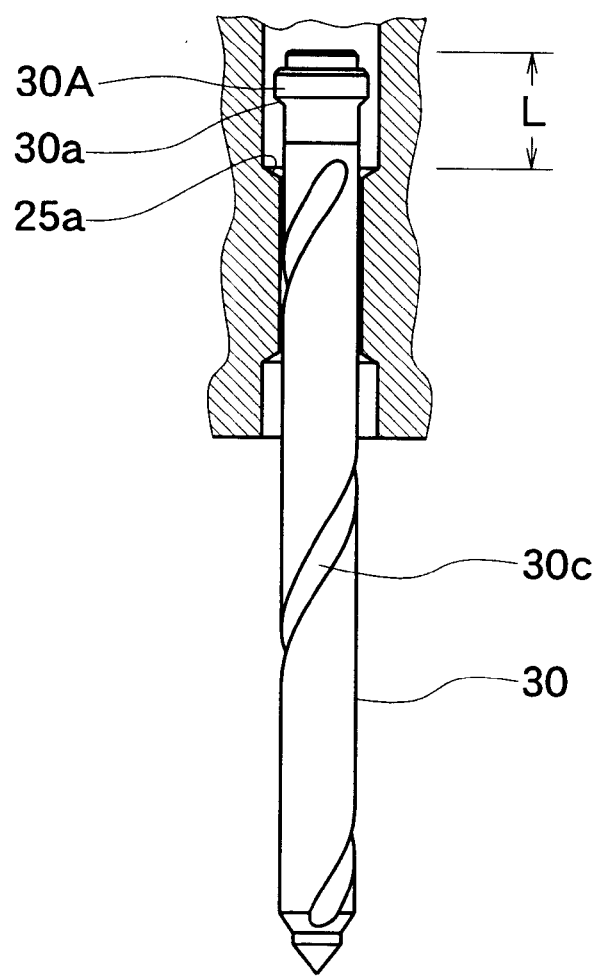
FIG. 6 is a partially enlarged view showing the detailed construction of a center pin of the cutter whose tip and right half portion are illustrated in FIG. 1 and that of a through hole portion of the cutter through which the center pin is inserted.

Moreover, a helical groove 30c is formed on the outer periphery of the center pin 30 excluding a predetermined dimension (distance) L from the upper end as shown in FIG. 6 illustrating the enlarged center pin. In a state in which the sheet faces 25a and 30a are separated from each other, a coolant can be supplied in a necessary amount from an upper portion to a lower portion when the center pin 30 retreats to the base end side by the predetermined dimension L or more. The predetermined dimension L is set almost equal to a dimension W at which the tip of the center pin 30 projects from the cutting edge portion of the tip of the shank toward the tip side in a free state (external force does not act on the center pin 30 from the tip side) in which the center pin 30 is pressed from the base end side toward the tip side by means of the coiled spring 11.

Furthermore, a ring-shaped member 15 is provided in a slightly lower portion of the center of the arbor body 1 in an axial direction to freely rotate with respect to the arbor body 1 and to be liquid-tight by an O ring 16. In addition, a through hole 15a is formed on the ring-shaped member 15 toward the central side in a radial direction, and a through hole 13 is formed to communicate with the through hole 15a. The through hole 13 has a tip which reaches the inner peripheral face of the bottomed hole 10 from the outer peripheral face of the arbor body 1 and is opened on the inner peripheral face of the bottomed hole 10. In FIG. 1, a screw 17 fixed to the left end of the ring-shaped member 15 is to be attached to a fixture which is not shown.

Accordingly, when the coolant is supplied from the through hole 15a of the ring-shaped member 15, it can be fed toward the through hole 25 (center pin 30) side through the through hole 13 and bottomed hole 10 of the rotating arbor body 1. More specifically, a passage for the coolant is formed from the through hole 15a of the ring-shaped member 15 to the through hole 25 (center pin 30). The coolant can be supplied from the inner peripheral side of the cutter B to a cut portion only during drilling.

In the shank attaching structure having the above-mentioned structure, the cutter can easily be attached and detached to and from the arbor in the following manner, and a work can simply be performed without using a special machine tool. Furthermore, assembly can easily be carried out. In addition, the coolant can automatically be supplied to the rotating cutter also during the drilling work if necessary. More specifically, when the cutter B is to be attached to the arbor A, the shank 20 of the cutter B is inserted into the opening portion 2 of the arbor A so that the stepped portion 21 of the shank 20 abuts against the inclined face 6a of the first sleeve 6, thereby causing the first sleeve 6 to retreat to the base end side of the arbor A. As a result, the constraint of the ball 5 toward the inside diameter in the radial direction is released so that the ball 5 projects into the inside diameter side. Consequently, the ball 5 is moved along the outer peripheral face of the shank 20 according to the insertion of the shank 20 and is then accommodated in the concave portion 23 of the shank 20. As a result, the shank 20 is fixed onto the arbor A side in that state as shown in FIG. 1.

When the cutter B is to be detached from the arbor A, it is sufficient that the second sleeve 3 is moved toward the tip (downward in FIG. 1) with respect to the arbor body 1 against the elastic force of the coiled spring 4 in the state shown in FIG. 1. If the second sleeve 3 is thus moved, the ball 5 corresponds to the annular groove 3a of the second sleeve 3 to move (retreat) toward the outside diameter so that a part of the ball 5 is accommodated in the groove 3a. As a result, the engagement state of the ball 5 with the concave portion 23 is released. Thus, the cutter B can easily be detached downward from the arbor A. In this case, the first sleeve 6 is moved toward the tip side (downward in FIG. 1) with respect to the arbor body 1 by the spring force of the coiled spring 8 according to the movement of the shank 20 downward (toward the tip side). Consequently, the ball 5 is held on the inside diameter side by the first sleeve 6 as shown in FIG. 4. In this case, the abutment face 6b of the first sleeve 6 abuts against and holds the ball 5 on the base end (upper end in FIG. 1) side. As a result, the ball 5 is held in the holding hole 9 in that state.

As described above, when drilling is to be performed on a substance to be drilled such as a steel plate with the cutter B attached to the arbor A, a hose for supplying the coolant is connected to the through hole 15a of the ring-shaped member 15 shown in FIG. 1, thereby supplying the coolant. Consequently, before the tip of the center pin 30 abuts against the substance to be drilled, the coolant is not supplied by the contact of the sheet faces 25a and 30a. When the center pin 30 retreats toward the base end side by a predetermined dimension (the above-mentioned dimension L), that is, the drilling work is started by a cutting edge portion 22, the coolant is supplied from the through hole 15a to the cutting edge portion 22 of the cutter B positioned in an outside diameter direction through the bottomed hole 10, the through hole 25 of the shank 20, the sheet faces 25a and 30a, and the spiral groove 30c of the center pin 30.

With the shank attaching structure, since the first sleeve 6 and the second sleeve 3 are circular or are formed on a shape basis by combination thereof, they can easily be processed by simply using a general-purpose lathe or the like. In addition, since the portions of the arbor body 1 are also circular or are formed on a shape basis by combination thereof, they can easily be processed by using a general-purpose lathe or a drilling machine. Moreover, since the coiled spring which is an elastic member is simply attached to an inner peripheral face or an outer peripheral face, assembly can easily be performed.

Second Embodiment

A second embodiment of the present invention will be described below with reference to FIGS. 7 to 11. A shank attaching structure according to the second embodiment is basically identical to the shank attaching structure according to the first embodiment.

As shown in FIGS. 7 to 10, the shank attaching structure has an arbor A. The arbor A comprises an arbor body 101 including a tapered attachment portion 112 to be attached to a rotary shaft of a driving device, a bottomed hole 110 formed inside and an opening portion 102. In the vicinity of an open end of the opening portion 102, the arbor body 101 comprises six holding holes 109 which penetrate a wall portion of the arbor body 101. The six holding holes 109 are provided at regular intervals around the arbor body 101. An engagement member formed by a ball 105 is held in the holding holes 109.

Figure 7:
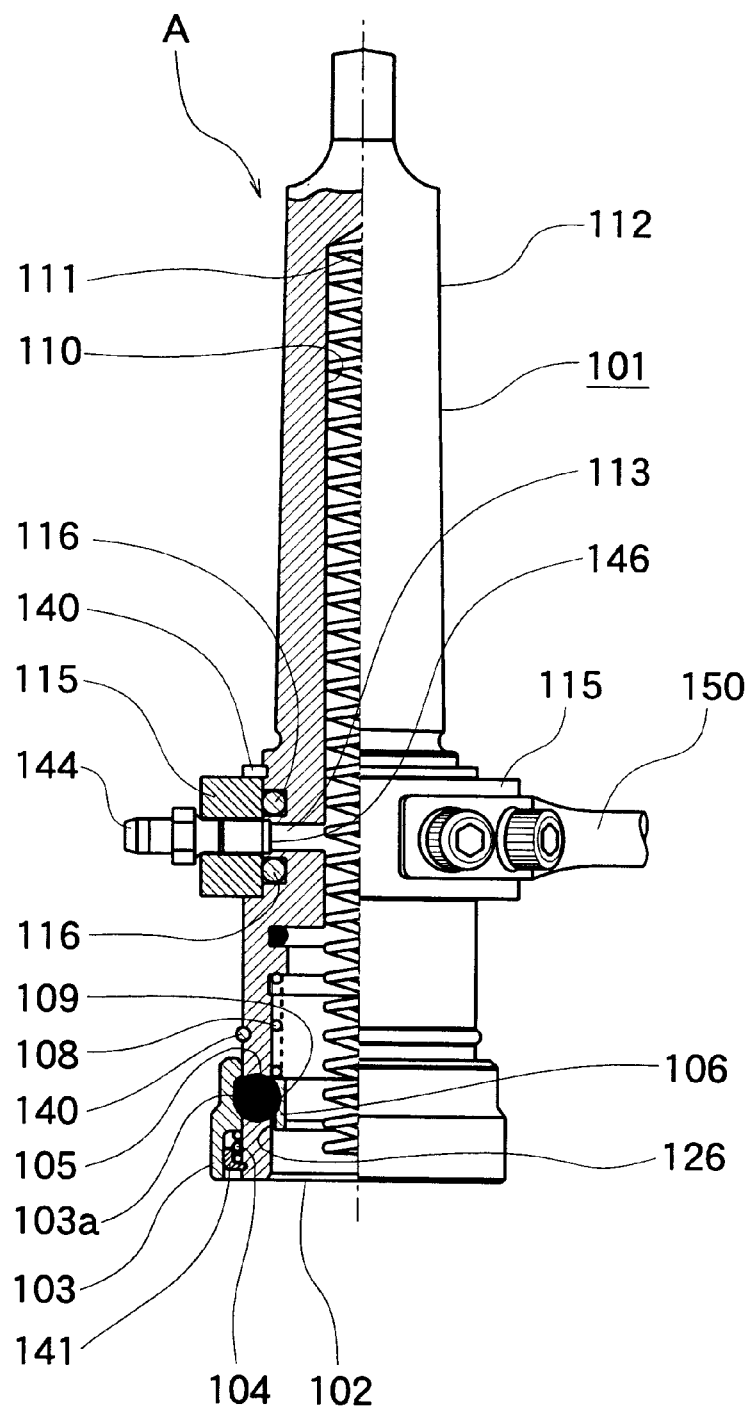
FIG. 7 is a sectional view showing a right half portion of the construction on the arbor side with a cutter detached from a shank attaching structure according to a second embodiment.
Figure 8:
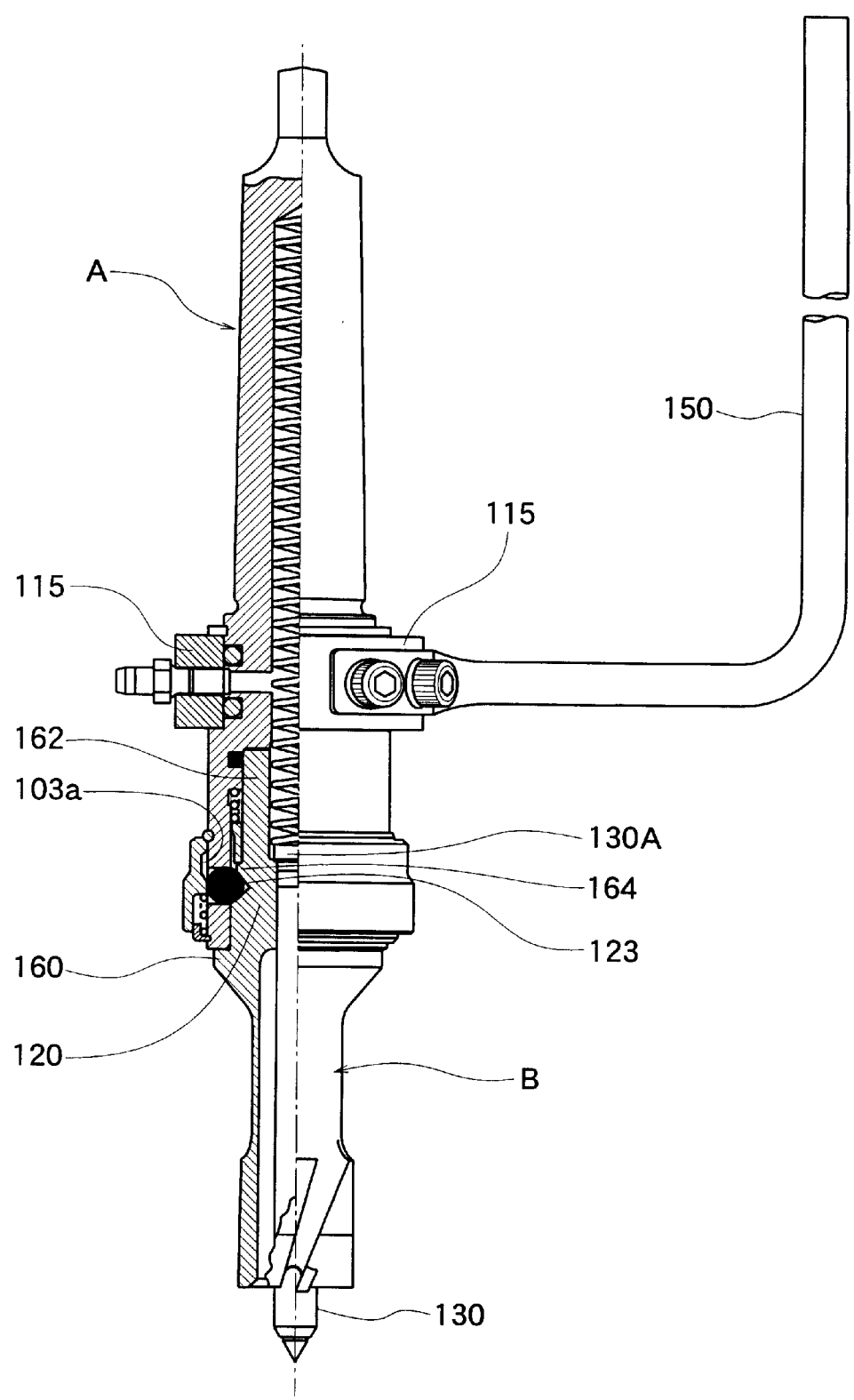
FIG. 8 is a sectional view showing a right half portion of the whole construction of the shank attaching structure according to the second embodiment illustrated in FIG. 7.

A first sleeve 106 (which is also referred to as an inner sleeve in the present embodiment) is provided to freely slide over the inner peripheral face of the bottomed hole 110 of the arbor body 101 in a longitudinal direction in the vicinity of the end of the opening portion 102. The first sleeve 106 is elastically pressed toward the end side of the opening portion 102 by a coiled spring 108. The first sleeve 106 has a wall face 126. The wall face 126 prevents the ball 105 acting as the engagement member from projecting from the holding hole 109 into the inner peripheral side of the arbor body 101. The second sleeve 103 (which is also referred to as a release collar in the present embodiment) is provided to freely slide along the outer peripheral face of the arbor body 101 in a longitudinal direction in the vicinity of the end of the opening portion 102. The second sleeve 103 is constituted to be slidable in a region from a position (non-holding position) where a shank 120 of a cutter B (see FIG. 8) is not held as shown in FIG. 7 to a position (holding position) where the shank i20 of the cutter B is held as shown in FIG. 8. In the non-holding position, the ball 105 acting as the engagement member is permitted to enter an annular L-shaped groove 103a which is formed on the inner peripheral face of the second sleeve 103. In the non-holding position, the first sleeve 106 can be moved to hold the ball 105 acting as the engagement member on the inner periphery.

In the holding position, the ball 105 acting as the engagement member is pushed out from the groove 103a formed on the second sleeve 103 inwardly in the radial direction and is then moved inwardly in the radial direction of the arbor body 101 as shown in FIG. 8. The ball 105 cannot be moved inwardly in the radial direction of the arbor body 101 as described above before the first sleeve 106 is moved toward the base end of the arbor body 101 in the longitudinal direction. The second sleeve 103 is pressed by a coiled spring 104 in such a direction as to move to the holding position. The opening end side of the opening portion 102 of the coiled spring 104 is held by a stopper (spring retainer) 141 for preventing drop-off. An annular engagement ring 140 regulates the movement of the second sleeve 103 toward the base end side with respect to the arbor body 101, that is, stops a slide region provided toward the base end side.

A ring-shaped member (coolant collar) 115 is rotatably provided with respect to the arbor body 101 on the outer peripheral face provided slightly below the central portion of the arbor body 101, and the ring-shaped member 115 is held in that position by a snap ring 140. Two O rings 116 are provided between the arbor body 101 and the ring-shaped member 115 to hold a liquid-tightness therein. A coolant coupling 144 is screwed to the ring-shaped member 115 in order to supply the coolant to the arbor body 101. The arbor body 101 has an annular groove 146 on the outer periphery thereof, and has a through hole 113 communicating with the groove 146 to guide the coolant from the groove 146 to the inside of the arbor body 101. In the present embodiment, an arbor arm 150 for preventing the rotation of the ring-shaped member 115 in use is fixed to the ring-shaped member 115. Furthermore, a coiled spring 111 is provided on the bottomed hole 110 of the arbor body 101.

The shank attaching structure according to the present embodiment is designed to use an annular cutter B. The annular cutter B is provided a center pin 130 to freely retreat on the center line thereof. The annular cutter B includes a shank 120 having a first portion 160, a second portion 162 and an annular projection 164 positioned in the middle of the first portion 160 and the second portion 162. The first portion 160 and the second portion 162 have cylindrical shapes, and the first portion 160 has a greater diameter than the diameter of the second portion 162. The first portion 160 has a conical concave portion 123 formed thereon. The conical concave portion 123 is provided at a regular interval on the outer periphery of the shank 120. The center pin 130 has a flange portion 130A for closely coming (seating) in contact with the inside of the arbor body 101, and a longitudinal (axial) groove 130c (see FIGS. 9 to 11) capable of supplying the coolant to the cutter B side.

Figure 9:
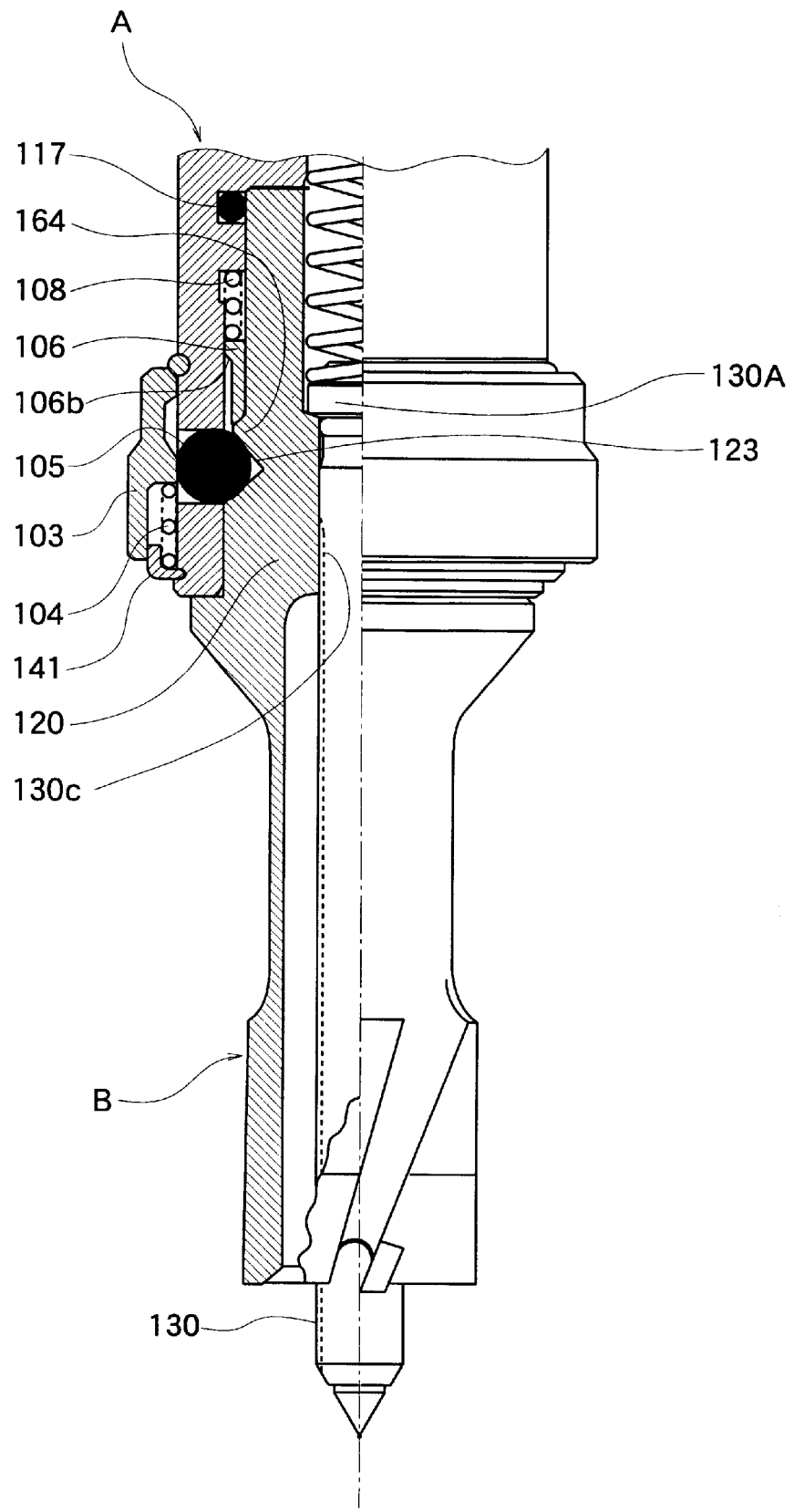
FIG. 9 is an enlarged view showing a main part of the shank attaching structure illustrated in FIG. 8.
Figure 10:
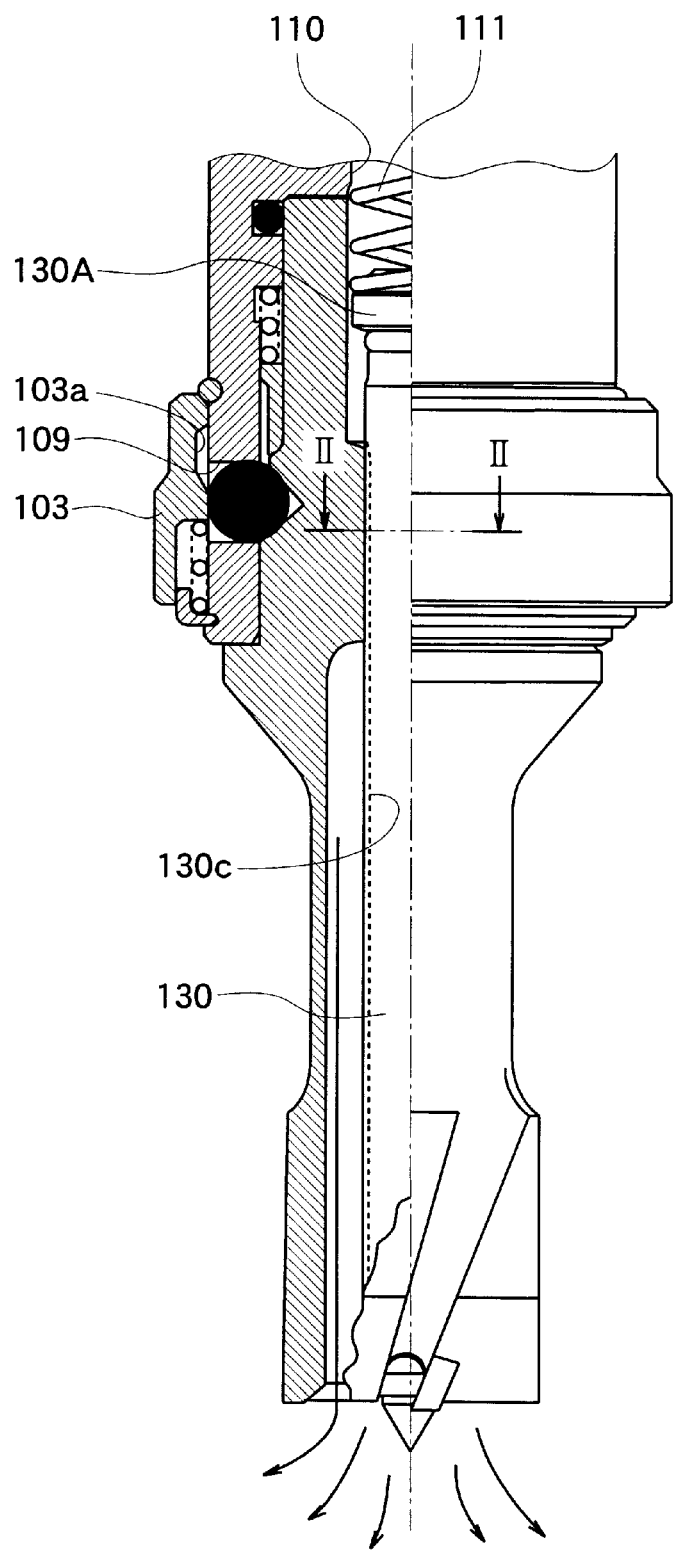
FIG. 10 is an enlarged view showing a state in which a center pin is brought into the base end side of the arbor in the shank attaching structure illustrated in FIG. 9.
Figure 11:
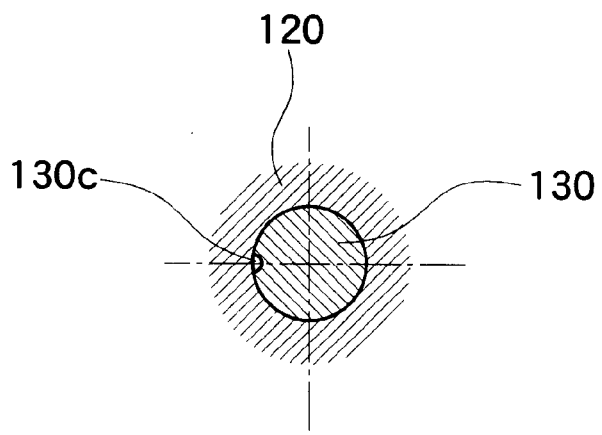
FIG. 11 is an enlarged sectional view taken along the line II—II in FIG. 10, showing a groove formed on the peripheral face of the center pin for supplying a coolant.
Figure 11:
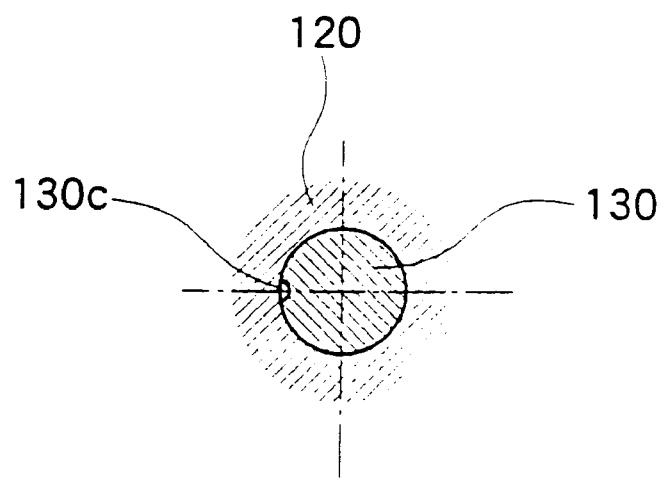

In use, the shank attaching structure having the above-mentioned structure is designed such that a shank portion of the cutter B can be inserted into the opening portion 102 of the arbor body 101 and the cutter B can surely be held in the arbor body 101 when the insertion is completed. The shank attaching structure is set in a state shown in FIG. 7 at the beginning. When the cutter B is inserted into the opening portion 102 of the arbor body 101, the annular projection 164 is engaged with the first sleeve 106. Consequently, the first sleeve 106 is moved toward the base end side of the arbor body 101 against the press force of the coiled spring 108. As soon as the cutter B is completely inserted into the arbor body 101, the ball 105 acting as the engagement member is moved inwardly in the radial direction and is then engaged with the concave portion 123 of the shank 120 of the cutter B. This operation is automatically performed through the second sleeve 103 by the press force of the coiled spring 104. At the same time that the operation of the ball 105 into the concave portion 123 is performed, the second sleeve 103 is moved to the holding position (see FIG. 8) by the press force of the coiled spring 104. The coolant can be supplied into the arbor body 101 through the ring-shaped member 115. During a cutting work, the cutter B is cut into a substance to be cut. Therefore, the center pin 130 is pressed toward the base end side with respect to the arbor body 101, and the flange portion 130A of the center pin 130 is released from a state in which it is in close contact with the inside of the cutter B. As shown in FIGS. 9 to 11, this operation permits the coolant to be supplied to the groove 130c through the flange portion 130A of the center pin 130. An O ring 117 provided in the arbor body 101 functions as a seal between the arbor body 101 and the shank 120 of the cutter B. Consequently, it is possible to prevent the coolant from leaking out to the outer periphery of the cutter B.

The cutter B attached to the arbor A is detached by moving the second sleeve 103 by hands toward the tip side of the arbor body 101 against the press force of the coiled spring 104. In the state of the non-holding position (see FIG. 7), the ball 105 is automatically moved outwardly in the radial direction by the function of the press force of the coiled spring 108 through the first sleeve 106 or through the shank 120 of the cutter B. When the ball 105 is moved outwardly in the radial direction, the cutter B is automatically discharged from the arbor body 101 by the press force of the coiled spring 111 through the first sleeve 106. At the same time that the cutter B is discharged, the first sleeve 106 is automatically moved toward the tip side of the arbor body 101 up to a position where an abutment face 106b abuts against the ball 105. In the state in which the first sleeve 106 is moved toward the tip side, it prevents the glove 105 from projecting into inner-side of the arbor body 101.

Industrial Applicability

The shank attaching structure according to the present invention can be utilized for attaching and detaching a cutting tool such as a cutter to and from a drilling machine, a hand powered drill, a hammer drill and the like. In addition, the shank attaching structure is simplified, is easy to work and can easily be assembled in a short time.

Accordingly, it is possible to manufacture the shank attaching structure more inexpensively than a conventional shank attaching structure and to obtain high reliability with the simple structure.

Moreover, the attachment and detachment of a cutter to the arbor side can easily be performed by one hand. Therefore, it is possible to save a time taken to exchange tools and to relieve an operator's labor.

Furthermore, it is possible to implement a one-touch typed shank attaching structure in which a coolant can be supplied easily and effectively only during a work.

What is claimed is:

1. A shank attaching structure in which an engagement member is provided on an inner peripheral face of an opening portion formed on a tip of an arbor so as to freely retreat in a direction of an outside diameter, and a shank provided on a base end of a cutter is detachably attached to the opening portion of the arbor with one touch, wherein the shank is formed to have such an outside diameter as to pass in a state in which the engagement member provided on the arbor retreats in the direction of the outside diameter, a diameter of a base end portion of the shank is further reduced to form a stepped portion for abutment, and a concave portion(s) for accommodating a projected portion of the engagement member projected in a direction of an inside diameter is/are formed on a tip side portion of the stepped portion, a first sleeve is provided on the inner peripheral face of the opening portion of the arbor in such a manner that a tip of the first sleeve can abut against the stepped portion of the shank to retreat toward a base end side and the state in which the engagement member is caused to retreat in the direction of the outside diameter can be kept by an outer peripheral face of the first sleeve, a holding hole for holding the engagement member in a slide operation region of the first sleeve is formed in a wall portion of the arbor, the state in which the engagement member retreats in the direction of the outside diameter is kept until a tip of the first sleeve pressed toward an open end by an elastic member to be abut by the stepped portion of the shank, a second sleeve is provided on the outer peripheral face of the arbor for being moved in at least one of directions of an axial tip and a base end, pressing the engagement member in the direction of the inside diameter by the inner peripheral face of the second sleeve with the movement in one of the directions, and accommodating the engagement member in the direction of the outside diameter without the movement in one of the directions, and the second sleeve is pressed in one of the directions by an elastic member, thereby keeping a state in which the engagement member is accommodated in the concave portion of the shank, and the second sleeve is moved in a direction opposite to the one of the directions against elastic force of the elastic member, thereby causing the engagement member to retreat in the direction of the outside diameter.

2. The shank attaching structure according to claim 1, wherein one of the axial directions of the second sleeve is a base end side and a direction opposite to the one of the axial directions is a tip side.

3. The shank attaching structure according to claim 1, wherein one of the axial directions of the second sleeve is a tip side and a direction opposite to the one of the axial directions is a base end side.

4. The shank attaching structure according to claim 1, wherein the engagement member is a ball, the elastic member for pressing the first sleeve is formed of a coiled spring having such a dimension as to cause the outer periphery of the coiled spring to be provided along the inner peripheral face of the opening portion of the arbor, and the elastic member for pressing the second sleeve is a coiled spring having such a dimension as to cause the inner periphery of the coiled spring to be provided along the outer peripheral face of the arbor and to cause the outer periphery of the coiled spring to be provided along the inner peripheral face of the second sleeve.

5. The shank attaching structure according to claim 1, wherein the opening portion of the arbor is extended toward the base end side to form a hole portion for supplying a coolant and to form, on the hole portion, a through hole having a tip open and extending in a radial direction is formed on the hole portion, a ring member is rotatably attached to the arbor on the outer periphery of the arbor where the hole is positioned, and a sealing member for a liquid seal is provided between the ring member and the arbor, and a passage for supplying the coolant from an upper end toward a tip side is formed in an axial core portion of the shank.

6. The shank attaching structure according to claim 4, wherein the opening portion of the arbor is extended toward the base end side to form a hole portion for supplying a coolant and to form, on the hole portion, a through hole having a tip open and extending in a radial direction is formed on the hole portion, a ring member is rotatably attached to the arbor on the outer periphery of the arbor where the hole is positioned, and a sealing member for a liquid seal is provided between the ring member and the arbor, and a passage for supplying the coolant from an upper end toward a tip side is formed in an axial core portion of the shank.

7. The shank attaching structure according to claim 5, wherein a coiled spring is provided in the hole portion for supplying the coolant, and a center pin is provided in a inserting hole of the shank so as to retreat toward the hole portion side in such a manner that it is pressed toward a tip side by the coiled spring and the tip projects from a tip of a cutter, and a flange portion is formed in a base end portion of the center pin for being engaged with the shank side when the center pin projects, and a liquid sealing mechanism is formed for performing a liquid seal in a state in which the flange portion abuts against an engagement face of an upper end of the inserting hole with which the flange portion is engaged.

8. The shank attaching structure according to claim 6, wherein a coiled spring is provided in the hole portion for supplying the coolant, and a center pin is provided in a inserting hole of the shank so as to retreat toward the hole portion side in such a manner that it is pressed toward a tip side by the coiled spring and the tip projects from a tip of a cutter, and a flange portion is formed in a base end portion of the center pin for being engaged with the shank side when the center pin projects, and a liquid sealing mechanism is formed for performing a liquid seal in a state in which the flange portion abuts against an engagement face of an upper end of the inserting hole with which the flange portion is engaged.

9. The shank attaching structure according to claim 7, wherein the flange portion and the engagement face forming the liquid sealing mechanism comprise tapered faces which are contacted each other.

10. The shank attaching structure according to claim 8, wherein the flange portion and the engagement face forming the liquid sealing mechanism comprise tapered faces which are contacted each other.

11. The shank attaching structure according to claim 9, wherein a groove for forming a coolant passage is provided below a position which is lower by a predetermined dimension based on a lower portion of the flange portion of the center pin in the composition which includes the outer peripheral face of the center pin and the inner peripheral face of the inserting hole of the shank which is in contact with the outer peripheral face.

12. The shank attaching structure according to claim 10, wherein a groove for forming a coolant passage is provided below a position which is lower by a predetermined dimension based on a lower portion of the flange portion of the center pin in the composition which includes the outer peripheral face of the center pin and the inner peripheral face of the inserting hole of the shank which is in contact with the outer peripheral face.

13. The shank attaching structure according to claim 11, wherein the position which is lower by the predetermined dimension is substantially equal to a dimension with which the center pin projects from a cutting edge portion on the tip of the cutter toward the tip side in a free state in which the center pin is pressed from the base end toward the tip by the coiled spring.

14. The shank attaching structure according to claim 12, wherein the position which is lower by the predetermined dimension is substantially equal to a dimension with which the center pin projects from a cutting edge portion on the tip of the cutter toward the tip side in a free state in which the center pin is pressed from the base end toward the tip by the coiled spring.

* * * * *

US006250856C1

(12) REEXAMINATION CERTIFICATE (4743rd)
United States Patent
Miyanaga

(10) Number: US 6,250,856 C1
(45) Certificate Issued: *Feb. 25, 2003

(54) QUICK ATTACHMENT STRUCTURE FOR DRILL SHANK

(75) Inventor: Masaaki Miyanaga, Miki (JP)

(73) Assignee: Kabushiki Kaisha Miyanaga, Miki (JP)

Reexamination Request:
No. 90/006,155, Dec. 10, 2001

Reexamination Certificate for:
Patent No.: 6,250,856
Issued: Jun. 26, 2001
Appl. No.: 09/380,161
Filed: Nov. 22, 1999

(*) Notice: This patent is subject to a terminal disclaimer.

(21) Appl. No.: 09/380,161
(22) PCT Filed: Feb. 25, 1998
(86) PCT No.: PCT/JP98/00792
§ 371 (c)(1),
(2), (4) Date: Nov. 22, 1999
(87) PCT Pub. No.: WO98/37999
PCT Pub. Date: Sep. 3, 1998

Related U.S. Application Data
(60) Provisional application No. 60/039,563, filed on Feb. 8, 1997.

(30) Foreign Application Priority Data
Oct. 21, 1997 (JP) ............................................. 9-288092

(51) Int. Cl.⁷ ........................... B23B 31/22; B23B 51/00
(52) U.S. Cl. .......................... 408/57; 279/75; 408/204; 408/226; 408/240
(58) Field of Search ............................. 408/57, 59, 204, 408/226, 240; 279/22, 30, 75, 155, 905

(56) References Cited

U.S. PATENT DOCUMENTS 3,788,658 A * 1/1974 Benjamin et al. ............ 279/155

FOREIGN PATENT DOCUMENTS

| JP | 354116797 A | * 9/1979 | .................. 408/59 |
| JP | UM 60-97218 | 7/1985 | |
| JP | UM 63-186512 | 11/1988 | |
| JP | UM 6-75611 | 10/1994 | |

* cited by examiner

*Primary Examiner*—Steven C. Bishop

(57) ABSTRACT

A shank fitting structure simple in structure and easy to machine and assemble. A shank (20) has an external diameter large enough to allow it passage in a state where a detent member (5) is moved bach radially outward, and includes a stepped portion (21) for butting by providing a small diameter portion on the end side an d a recess (23) for housing the projecting part of the detent member (5) formed in the tip part. On the internal circumferential face of an opening part (2) of an arbor A, a first sleeve (6) is provided and pressed by an elastic member (8) toward the edge of the opening in such a way that its tip comes into contact with the stepped portion (21) of the shank (20) and its external circumferential face can keep the detent member (6) back toward the external circumference. A holding hole (9) for holding the detent member (5) within the range of its sliding movement is made in the wall of the arbor A, and a second sleeve (3) capable of being moved back toward the base end and pressing the detent member radially inward by the inner circumferential face when the second member is moved back toward the base end is disposed on the external circumferential face of the arbor.

Fig.12 New
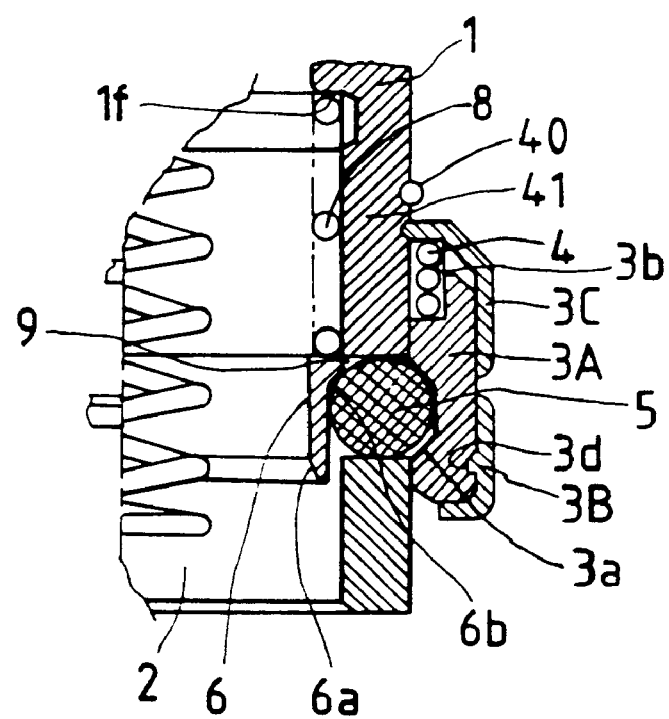

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

ONLY THOSE PARAGRAPHS OF THE SPECIFICATION AFFECTED BY AMENDMENT ARE PRINTED HEREIN.

Column 7, lines 7–30:

Furthermore, a bottomed hole 10 having a smaller diameter than the diameter of the opening portion 2 of the arbor body 1 is formed on a line extending toward the base end (an upper end in FIGS. 1 and 2) side of a center line of the opening portion 2. A compressible coiled spring 11 is provided in the bottomed hole 10. On the other hand, a through hole 25 is formed on a center line (axial core) of the shank 20 of the cutter B, and a center pin 30 is provided in the through hole ([a] *an* "inserting hole" [according to claim 5]) 25 to freely retreat toward the arbor A side. The through hole 25 is constituted such that a base end (upper end) portion has a large diameter and the tip (lower end) side has an inside diameter (accurately, which is slightly larger than) equal to the outside diameter of the center pin 30, and a connecting portion thereof is provided with a tapered sheet face ([a] *an* "engagement face" [according to claim 5]) 25*a* forming a liquid sealing mechanism together with the sheet face 30*a*. The center pin 30 has a flange portion 30A. A lower end of the flange portion 30A is provided with a tapered sheet face 30*a* which can closely come in contact with the sheet face 25*a*. The lower end of the coiled spring 11 for pressing the center pin 30 toward the tip is engaged with an upper end of the flange portion 30A. The center pin 30 is provided to retreat toward the arbor A side with respect to the cutter B against the press force of the coiled spring 11.

Column 5, line 17:

*FIG. 12 is an enlarged view similar to FIG. 4, showing the second sleeve positioned so that the second sleeve is moved toward a base end for release of the cutter from the arbor.*

THE DRAWING FIGURES HAVE BEEN CHANGED AS FOLLOWS:

New FIG. 12 added.

AS A RESULT OF REEXAMINATION, IT HAS BEEN DETERMINED THAT:

Claims 1, 2, 3, 9 and 10 are determined to be patentable as amended.

Claims 4–8 and 11–14, dependent on an amended claim, are determined to be patentable.

New claims 15–26 are added and determined to be patentable.

1. A shank attaching structure in which an engagement member is provided on an inner peripheral face of an opening portion formed on a tip of an arbor so as to freely retreat in a direction of an outside diameter, and a shank provided on a base end of a cutter is detachably attached to the opening portion of the arbor with one touch, wherein the shank is formed to have such an outside diameter, *extending from radially extending structure,* as to pass in a state in which the engagement member provided on the arbor retreats in the direction of the outside diameter, a diameter of a base end portion of the shank is further reduced to form a stepped portion for abutment, and a concave portion(s) for accommodating a projected portion of the engagement member projected in a direction of an inside diameter is/are formed on a tip side portion of the stepped portion, a first sleeve is provided on the inner peripheral face of the opening portion of the arbor in such a manner that a tip of the first sleeve can abut against the stepped portion of the shank to retreat toward a base end side and the state in which the engagement member is caused to retreat in the direction of the outside diameter can be kept by an outer peripheral face of the first sleeve, a holding hole for holding the engagement member in a slide operation region of the first sleeve is formed in a wall portion of the arbor, the state in which the engagement member retreats in the direction of the outside diameter is kept until a tip of the first sleeve *is* pressed toward an open end by an elastic member to be [abut] *abutted* by the stepped portion of the shank, a second sleeve is provided on the outer peripheral face of the arbor for being moved in at least one of directions of an axial tip and a base end, pressing the engagement member in the direction of the inside diameter by the inner peripheral face of the second sleeve with the movement in *said* one of the directions, and accommodating the engagement member in the direction of the outside diameter without the movement in *said* one of the directions, and the second sleeve is pressed in *said* one of the directions by an elastic member, thereby keeping a state in which the engagement member is accommodated in the concave portion of the shank, and the second sleeve is moved in a direction opposite to the *said* one of the directions against elastic force of the elastic member, thereby causing the engagement member to retreat in the direction of the outside diameter.

2. The shank attaching structure according to claim 1, wherein *said* one of the axial directions of the second sleeve is a base end side and a direction opposite to the one of the axial directions is a tip side.

3. The shank attaching structure according to claim 1, wherein *said* one of the axial directions of the second sleeve is a tip side and a *said* direction opposite to the one of the axial directions is a base end side.

9. The shank attaching structure according to claim 7, wherein the flange portion and the engagement face forming the liquid sealing mechanism comprise tapered faces which are contacted *with* each other.

10. The shank attaching structure according to claim 8, wherein the flange portion and the engagement face forming the liquid sealing mechanism comprise tapered faces which are contacted *with* each other.

*15. A shank attaching structure in which an engagement member is provided on an inner peripheral face of an opening portion formed on a tip of an arbor so as to freely retreat in a direction of an outside diameter, and a shank provided on a base end of a cutter is detachably attached to the opening portion of the arbor with one touch,*

*wherein the shank is formed to have such an outside diameter as to pass in a state in which the engagement* member provided on the arbor retreats in the direction of the outside diameter, a diameter of a base end portion of the shank is further reduced to be disposed within a first sleeve and to form a stepped portion for abutment, and a concave portion(s) for acommodating a projected portion of the engagement member projected in a direction of an inside diameter is/are formed on a tip side portion of the stepped portion, said first sleeve is provided on the inner peripheral face of the opening portion of the arbor in such a manner that a tip of the first sleeve can abut against the stepped portion of the shank to retreat toward a base end side and the state in which the engagement member is caused to retreat in the direction of the outside diameter can be kept by an outer peripheral face of the first sleeve, a holding hole for holding the engagement member in a slide operation region of the first sleeve is formed in a wall portion of the arbor, the state in which the engagement member retreats in the direction of the outside diameter is kept until a tip of the first sleeve is pressed toward an open end by an elastic member to be abutted by the stepped portion of the shank, a second sleeve is provided on the outer peripheral face of the arbor for being moved in at least one of directions of an axial tip and a base end, pressing the engagement member in the direction of the inside diameter by the inner peripheral face of the second sleeve with the movement in one of the directions, and accommodating the engagement member in the direction of the outside diameter without the movement in said one of the directions, and the second sleeve is pressed in said one of the directions by an elastic member, thereby keeping a state in which the engagement member is accommodated in the concave portion of the shank, and the second sleeve is moved in a direction opposite to the said one of the directions against elastic force of the elastic member, thereby causing the engagement member to retreat in the direction of the outside diameter.

16. The shank attaching structure according to claim 15, wherein the tip of the first sleeve is angled with respect to a radius of the first sleeve for contact against said stepped portion of the shank.

17. The shank attaching structure according to claim 16, wherein the stepped portion of the shank is angled complementary to the angled tip of the first sleeve for contact therewith.

18. The shank attaching structure according to claim 15, wherein the first sleeve slides along an inner peripheral face of the opening portion of the arbor between a first sleeve position wherein the first sleeve tip abuts against the stepped portion of the shank and a second sleeve position wherein the engagement member retreats in the direction of the outside diameter.

19. A shank attaching structure in which an engagement member is provided on an inner peripheral face of an opening portion formed on a tip of an arbor so as to freely retreat in a direction of an outside diameter, and a shank provided on a base end of a cutter is detachably attached to the opening portion of the arbor with one touch, wherein the shank is formed to have such an outside diameter as to pass in a state in which the engagement member provided on the arbor retreats in the direction of the outside diameter, a diameter of a base end portion of the shank is reduced to form a stepped portion on an outer peripheral face of the shank for abutment, and a concave portion(s) for accommodating a projected portion of the engagement member projected in a direction of an inside diameter is/are formed on a tip side portion of the stepped portion, a first sleeve is disposed between the inner peripheral face of the opening portion of the arbor and an outer peripheral face of the reduced diameter portion of the shank in such a manner that a tip of the first sleeve can abut against the stepped portion of the shank to retreat toward a base end side and the state in which the engagement member is caused to retreat in the direction of the outside diameter can be kept by an outer peripheral face of the first sleeve, a holding hole for holding the engagement member in a slide operation region of the first sleeve is formed in a wall portion of the arbor, the state in which the engagement member retreats in the direction of the outside diameter is kept until a tip of the first sleeve is pressed toward an open end by an elastic member to be abutted by the stepped portion of the shank, a second sleeve is provided on the outer peripheral face of the arbor for being moved in at least one of directions of an axial tip and a base end, pressing the engagement member in the direction of the inside diameter by the inner peripheral face of the second sleeve with the movement in one of the directions, and accommodating the engagement member in the direction of the outside diameter without the movement in said one of the directions, and the second sleeve is pressed in said one of the directions by an elastic member, thereby keeping a state in which the engagement member is accommodated in the concave portion of the shank, and the second sleeve is moved in a direction opposite to the said one of the directions against elastic force of the elastic member, thereby causing the engagement member to retreat in the direction of the outside diameter.

20. The shank attaching structure according to claim 19, wherein the tip of the first sleeve is angled with respect to a radius of the first sleeve for contact against said stepped portion of the shank.

21. The shank attaching structure according to claim 20, wherein the stepped portion of the shank is angled complementary to the angled tip for contact therewith.

22. The shank attaching structure according to claim 19, wherein the first sleeve slides along an inner peripheral face of the opening portion of the arbor between a first sleeve position wherein the first sleeve tip abuts against the stepped portion of the shank and a second sleeve position wherein the engagement member retreats in the direction of the outside diameter.

23. A shank attaching structure in which an engagement member is provided on an inner peripheral face of an opening portion formed on a tip of an arbor so as to freely retreat in a direction of an outside diameter, and a shank provided on a base end of a cutter is detachably attached to the opening portion of the arbor with one touch, wherein the shank is formed to have a larger diameter portion, and a reduced diameter portion having an outside diameter as to pass in a state in which the engagement member provided on the arbor retreats in the direction of the outside diameter, said reduced diameter portion forming a stepped portion for abutment, and a concave portion(s) for accommodating a projected portion of the engagement member projected in a direction of an inside diameter is/are formed on a tip side portion of the stepped portion, and wherein the larger diameter portion, the stepped portion, and the reduced diameter portion of the shank all are received within the opening portion of the arbor, a first sleeve is provided on the inner peripheral face of the opening portion of the arbor in such a manner that a tip of the first sleeve can abut against the stepped portion of the shank to retreat toward a base end side and the state in which the engagement member is caused to retreat in the direction of the outside diameter can be kept by an outer peripheral face of the first sleeve, a holding hole for holding the engagement member in a slide operation region of the first sleeve is formed in a wall portion of the arbor, the state in which the engagement member retreats in the direction of the outside diameter is kept until a tip of the first sleeve pressed toward an open end by an elastic member to be abutted by the stepped portion of the shank, a second sleeve is provided on the outer peripheral face of the arbor for being moved in at least one of directions of an axial tip and a base end, pressing the engagement member in the direction of the inside diameter by the inner peripheral face of the second sleeve with the movement in one of the directions, and accommodating the engagement member in the direction of the outside diameter without the movement in one of the directions, and the second sleeve is pressed in one of the directions by an elastic member, thereby keeping a state in which the engagement member is accommodated in the concave portion of the shank, and the second sleeve is moved in a direction opposite to the one of the directions against elastic force of the elastic member, thereby causing the engagement member to retreat in the direction of the outside diameter.

24. The shank attaching structure according to claim 23, wherein the tip of the first sleeve is angled with respect to a radius of the first sleeve for contact against said stepped portion of the shank.

25. The shank attaching structure according to claim 24, wherein the stepped portion of the shank is angled complementary to the angled tip of the first sleeve for contact therewith.

26. The shank attaching structure according to claim 23, wherein the first sleeve slides along an inner peripheral face of the opening portion of the arbor between a first sleeve position wherein the first sleeve tip abuts against the stepped portion of the shank and a second sleeve position wherein the engagement member retreats in the direction of the outside diameter.

\* \* \* \* \*